United States Patent [19]

Kushlefsky et al.

[11] 3,906,103

[45] Sept. 16, 1975

[54] PESTICIDAL COMPOSITION AND METHOD

[75] Inventors: Bernard G. Kushlefsky, Edison, N.J.; Wendell K. Whitney, Midland, Mich.

[73] Assignees: M & T Chemicals Inc., Greenwich, Conn.; The Dow Chemical Company, Midland, Mich.

[22] Filed: Mar. 14, 1974

[21] Appl. No.: 451,065

Related U.S. Application Data

[60] Continuation of Ser. No. 96,444, Sept. 9, 1970, abandoned, which is a division of Ser. No. 749,625, Aug. 2, 1968, Pat. No. 3,609,173.

[52] U.S. Cl. ............... 424/288; 71/3; 424/357
[51] Int. Cl.² ............................................ A01N 9/00
[58] Field of Search ................................. 424/288

[56] References Cited
UNITED STATES PATENTS

| | | | |
|---|---|---|---|
| 3,038,877 | 6/1962 | Harrington et al. | 260/429.7 X |
| 3,099,668 | 7/1963 | Zweigle et al. | 260/429.7 |
| 3,113,144 | 12/1963 | Zweigle | 260/429.7 |
| 3,129,236 | 4/1964 | Weissenberger | 260/429.7 |
| 3,400,201 | 9/1968 | Mocotte | 260/429.7 X |
| 3,409,653 | 11/1968 | Stamm | 260/429.7 |
| 3,591,615 | 7/1971 | Bublitz | 424/288 X |

*Primary Examiner*—Albert T. Meyers
*Assistant Examiner*—Dale R. Ore
*Attorney, Agent, or Firm*—Robert P. Auber; Kenneth G. Wheeless; Robert Spector

[57] ABSTRACT

This invention comprises novel tricyclohexyltin compounds of the formula

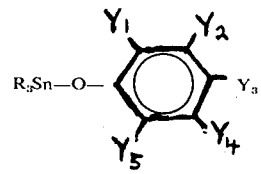

wherein R is cyclohexyl and $Y_{1-5}$ are the same or different and Y is selected from the group consisting of aryl, cycloalkyl, halogen, nitro, mercapto, cyano and hydrogen such that not more than four Y substituents are hydrogen. This invention also comprises methods of preparing said novel compounds. This invention also comprises pesticidal compositions containing as active components said novel compounds.

2 Claims, No Drawings

PESTICIDAL COMPOSITION AND METHOD

This application is a continuation of application Ser. No. 96,444, filed Sept. 9, 1970 now abandoned, which in turn is a divisional of application Ser. No. 749,625, filed Aug. 2, 1968, now U.S. Pat. No. 3,609,173.

This application relates to new and novel useful organotin compounds, pesticidal compositions containing said compounds, and the use of these compounds as biological toxicants.

The invention comprises novel tricyclohexyltin compounds of the formula

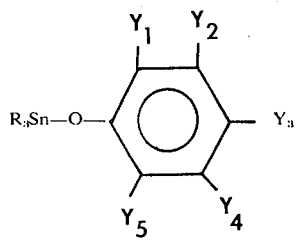

wherein R is cyclohexyl and $Y_{1-5}$ are the same or different and Y is selected from the group consisting of alkyl, aryl, cycloalkyl, halogen, nitro, mercapto, cyano, and hydrogen, such that not more than four Y substituents are hydrogen.

Examples of the foregoing compounds are:
tricyclohexyltin-4-nitrophenate
tricyclohexyltin pentachlorophenate
tricyclohexyltin-2,4,5-trichlorophenate
tricyclohexyltin-4-chloro-2-cyclopentyl phenate
tricyclohexyltin-2,4-dichlorophenate
tricyclohexyltin-4-cyanophenate
tricyclohexyltin-4-methylmercaptophenate
tricyclohexyltin-0-phenylphenate The tricyclohexyltin substituted phenolates which have been unknown until now are obtained by reacting as reactants tricyclohexyltin hydroxide and a substituted phenol in a solvent capable of azeotroping water. The reaction mass thus formed is heated until all of the water by-product is volatilized. The product thus formed is then isolated and purified by conventional means.

This invention comprises a method of forming novel compounds of the formula

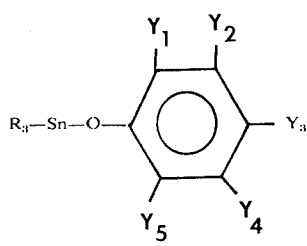

wherein R is cyclohexyl, $Y_{1-5}$ are the same or different and Y is selected from the group consisting of aryl, cycloalkyl, halogen, nitro, mercapto, cyano, and hydrogen such that not more than four Y substituents are hydrogen, comprising reacting as reactants in the presence of a solvent capable of azeotroping water tricyclohexyltin hydroxide and a phenolic compound of the formula

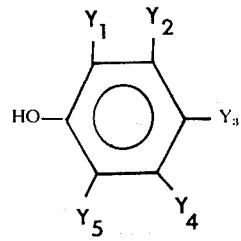

wherein Y is selected from the group consisting of alkyl, aryl, cycloalkyl, halogen, nitro, mercapto, cyano, and hydrogen such that not more than four Y substituents are hydrogen, heating said reaction mixture and separating said novel compounds.

Typical examples of substituted phenols which can be reacted with tricyclohexyltin include p-nitrophenol, 2,4,5-trichlorophenol, 4-chloro-2-cyclopentylphenol, 2,4-dichlorophenol, p-cyano-phenol, p-methylmercaptophenol, and o-phenylphenol.

In accordance with another of its aspects, this invention comprises a method for preparing tricyclohexyltin compounds of the formula

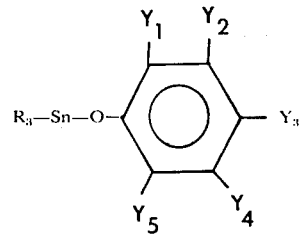

comprising reacting a cyclohexyl magnesium halide $(C_6H_{11})_3SnMgX$ and tin tetrahalide $SnX_4$ in molar ratio of 3:1 wherein X is an active halide selected from the group consisting of chloride and bromide comprises maintaining a reaction mixture containing $SnX_4$ in excess of $(C_6H_{11})MgX$, simultaneously adding to said reaction mixture $(C_6H_{11})MgX$ and the remainder of $SnX_4$ in molar ratio of 3:1, agitating said reaction mixture during said addition whereby said reaction mixture is maintained substantially uniform, and adding to said reaction mixture the remainder of said $(C_6H_{11})MgX$ thereby forming $(C_6H_{11})_3SnX$, reacting as reactants said $(C_6H_{11})_3SnX$ and a substituted compound of the formula

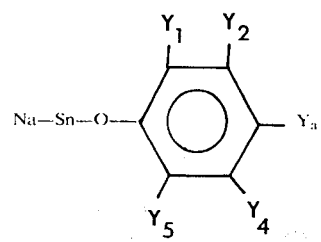

The tricyclohexyltin compounds of the formula

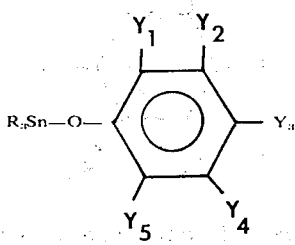

wherein R is cyclohexyl and $Y_{1-5}$ are the same or different and y is selected from the group consisting of alkyl, aryl, cycloalky, haogen, nitro, mercapto, cyano, and hydrogen, such that not more than four Y substituents are hydrogen formed in the practice of this invention include products wherein the cyclohexyl group herein designated $C_6H_{11}$, is inertly substituted.

Typical products formed by the process include: tri(2-methylcyclohexyl) tin substituted phenate tri(2-butylcyclohexyl) tin substituted phenate tri(2-phenylcyclohexyl) tin substituted phenate tri(3,3,5-trimethylcyclohexyl) tin substituted phenate tri(3,5-dimethylcyclohexyl) tin substituted phenate tri(4-t-butylcyclohexyl) tin substituted phenate tri(2-isopropyl-5-methylcyclohexyl) tin substituted phenate tri(2,5-dimethylcyclohexyl) tin substituted phenate tri(3,4-dimethylcyclohexyl) tin substituted phenate The tin tetrahalide which may be used in practice of this invention may be $SnX_4$ wherein X may be an active halide selected from the group consisting of chloride and bromide. Preferably, $SnX_4$ may be tin tetrachloride, $SnCl_4$.

The Grignard reagent which may be used in practice of this invention, preferably cyclohexyl magnesium chloride (and including Grignard reagents containing inertly substituted cyclohexyl radicals as noted supra), may be prepared by the reaction of a cyclohalide with magnesium according to the following reaction:

$$(C_6H_{11})X + Mg \rightarrow (C_6H_{11})MgX$$

This reaction may preferably by carried out under an inert atmosphere, e.g. nitrogen gas, in the presence of an aliphatic ether such as diethyl ether, di-n-butyl ether, etc., or in the presence of a compound Q as hereinafter described. Various initiators may be present to facilitate formation of the Grignard reagent.

The compound Q, as this expression is used herein for the purpose of brevity, includes cyclic ethers containing 5–6 members in the ring with at least one hydrogen atom attached to each carbon atom in the ring and having the formula:

wherein X is a methylene group or an N-alkyl group; R'' is an unsubstituted saturated divalent aliphatic hydrocarbon radical; R' is an ethylene radical, an ethylenically unsaturated divalent hydrocarbon radical, a methylene radical, or =CHR''' (R''' being hydrogen or an aliphatic radical); and O is oxygen. When X is N-alkyl, the ring shall contain 6 members with X and O in a position 1:4 with respect to each other.

Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. The compound Q may bear as substituent inert groups, i.e. groups which are not reactive with organomagnesium halides, or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e. the free $\pi$-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled in the art from the present specification. Since compound Q may also function as a solvent, a compound Q which has a high melting point may be used in practice of this invention, but if it is used as solvent, the high melting point (e.g. above 90°C) may cause difficulty in carrying out the reaction.

The Grignard reagent formed by the process of, e.g. reaction (4) supra may be preferably in the form of a solution of its complex with the ether or the compound Q, e.g. as a solution of $(C_6H_{11})MgX.Q$ in Q. For purpose of convenience, the equations herein are written without reference to the ether or compound Q which may be present.

In practice of the process of this invention, the reaction between the tin tetrahalide $SnX_4$ and the Grignard reagent $(C_6H_{11})MgX$ may be:

$$3(C_6H_{11})MgX + SnX_4 \rightarrow (C_6H_{11})_3SnX + 3MgX_2$$

This reaction may be carried out by adding to a reaction vessel 1–100 mole percent, preferably 10–40 mole percent, say 25 mole percent of the $SnX_4$ to be used in the reaction. Preferably, this may also be added with appropriate solvent, typically a hydrocarbon having a boiling point of 30°C – 150°C, say about 137°C, including, e.g. toluene, heptane, cyclohexane, etc. The hydrocarbon may be xylene which may be added to the $SnX_4$ in amount of 10–20 moles, say 15 moles, per mole of $SnX_4$ to be consumed during the reaction. The tin tetrahalide $SnX_4$ and the solvent may be added to the reaction vessel in the form of a solution of tin tetrahalide.

To the preferably well-agitated reaction mixture containing $SnX_4$ in excess of $(C_6H_{11})MgX$, and preferably containing none of the latter, there may be simultaneously added the remainder of the $SnX_4$, i.e. 0–99 mole percent, preferably 60–90 mole percent, say 75 mole percent of the SnX$_4$ used in the reaction, together with all the Grignard reagent (C$_6$H$_{11}$)MgX.

In the preferred embodiment, the rates of addition of the added (C$_6$H$_{11}$)MgX and the SnX$_4$ during addition may be preferably maintained at 3 moles of (C$_6$H$_{11}$)MgX per mole of SnX$_4$. Control of the ratio during addition of the stated equivalent level of preferably 3:1 may be effected by controlling the flow of each of the reactants. The unusual results attained by the process of this invention may particularly result at least in part from the technique of controlling the ratio of rates of addition of the added materials so that it falls within this ratio of about 3±0.3:1. Thus the reaction medium at a given time may be considered as having been formed by mixing the reactants in equivalent, i.e. 3:1 molar proportion, preferably in the presence of an excess of SnX$_4$ corresponding to that which was present, if any, in the reaction vessel at the beginning of the reaction. The high degree of agitation preferably maintained in the reaction mixture insures that the reaction mixture is maintained uniform, i.e. that at no place in the reaction mixture is there any localized substantial excess of (C$_6$H$_{11}$)MgX.

Preferably, the exothermic reaction mixture may be maintained at 25°C – 95°C, preferably less than 80°C, say at 72°C. Reaction may, if desired, be carried out at 30°C – 40°C. Typically, the (C$_6$H$_{11}$)MgX and SnX$_4$ may be added to the reaction mixture over 60–210 minutes, say 120 minutes.

The remainder of the (C$_6$H$_{11}$)MgX, typically 5–100 mole percent, say 25 mole percent, may then be added to the reaction mixture over 15–60 minutes, say 30 minutes. Preferably the reaction mixture may during this addition be maintained at gentle reflux temperature, typically 75°C – 85°C when the refluxing liquid includes, e.g. xylene-tetrahydrofuran, for 30–240 minutes, say 120 minutes.

The reaction mixture may then be hydrolyzed to liberate (C$_6$H$_{11}$)$_3$SnX. Typically this may be effected by diluting the mixture at 30°C – 40°C, say 30°C with water, preferably containing electrolyte such as sulfuric acid in the amount of 1 –15%, say 10% by weight. Typically hydrolysis may be effected in two steps by mixing the reaction mixture in a first step with 300–400, say 325 parts by weight of water per mole of SnX$_4$ utilized which amount of water may be sufficient to form the hexahydrate MgX$_2$.6H$_2$0 and an organic layer. The organic layer may be separated and in a second step the hexahydrate dissolved in 150–500, say 300 parts of water, to which may be thereafter added electrolyte, say 150–300, say 250 parts of 10% sulfuric acid. The mixture may be agitated and the organic layer drawn off and combined with the earlier-obtained organic layer.

The novel compounds are useful as pesticides, e.g. as plant protecting agents, miticides, and insecticides. For these purposes they can be converted to emulsions, solutions, or mixed with fillers in a conventional manner.

EXAMPLE 1

Preparation of tricyclohexyltin-4-nitrophenate 96.3 grams (0.25 mole) of tricyclohexyltin hydroxide. 34.8 grams (0.25 mole) of p-nitrophenol were added to 500 milliliters of benzene in a one liter flask. The reaction mixture was heated to drive off water formed. The reaction was conducted in a continuously maintained nitrogen atmosphere. The reaction mixture was gravity filtered and then a resulting product was vacuum dried. The product, tricyclohexyltin-4-nitrophenate, exhibited a weight of 126 grams (the theoretical yield was 126.6 grams). The melting point was 80°C – 82°C.

ANALYSIS

| Percentage | Theory | Found |
|---|---|---|
| Sn | 23.45% | 23.67% |
| N | 2.77% | 2.81% |

EXAMPLE 2

Preparation of tricyclohexyltin pentachlorophenate 96.3 grams (0.25 mole) of tricyclohexyltin hydroxide and 66.6 grams (0.25 mole) of pentachlorophenol were added to 500 milliliters of benzene. The procedure of Example 1 was followed, including the maintenance of a nitrogen atmosphere at all times. The purified product exhibited a melting point range of 106.5°C – 110.5°C and a weight of 152.0 grams (theoretical 158.4 grams).

ANALYSIS

| Percentage | Theory | Found |
|---|---|---|
| Tin | 18.74% | 19.08% |
| Chlorine | 27.88% | 27.26% |

EXAMPLE 3

Preparation of tricyclohexyltin-2,4,5-trichlorophenate 96.3 grams of (0.25 mole) of tricyclohexyltin hydroxide and 49.36 grams of 2,4,5-trichlorophenol were added to 500 milliliters of benzene in a one liter flask. The procedure of Example 1 was followed, including the continuous maintenance of a nitrogen atmosphere. The product, tricyclohexyltin-2,4,5-trichlorophenate exhibited a weight of 107 grams (theoretical 141.15 grams).

ANALYSIS

| Percentage | Theory | Found |
|---|---|---|
| Tin | 21.02% | 21.00% |
| Chlorine | 18.84% | 16.05% |

EXAMPLE 4

Preparation of tricyclohexyltin 4-chloro-2-cyclopentyl phenate 96.3 grams (0.25 mole) of tricyclohexyltin hydroxide and 51.2 grams (0.25 mole) (96% pure) of 4-chloro-2-cyclopentyl phenol were added to 500 milliliters of benzene in a one liter flask. The procedure of Example 1 was followed, including the continuous maintenance of a nitrogen atmosphere. The product tricyclohexyltin-4-chloro-2-cyclopenylphenate, exhibited a weight of 134 grams (theoretical 143 grams) which was a 94.7% of theoretical yield.

ANALYSIS

| Percentage | Theory | Found |
|---|---|---|
| Tin | 20.75% | 20.97% |
| Chlorine | 6.2% | 5.79% |

EXAMPLE 5

Preparation of tricyclohexyltin 2,4-dichlorophenate 96.3 grams (0.25 mole) of tricyclohexyltin and 40.75 grams (0.25 mole) of 2,4-dichlorophenol were added to 500 milliliters of benzene in a one liter flask. The procedure of Example 1 was followed to obtain a purified tricyclohexyltin 2,4-dichlorophenate product exhibiting a weight of 114.5 grams (theoretical 132.5 grams) which was a 86.4% yield. The melting point range was 43°C – 45°C.

ANALYSIS

| Percentage | Theory | Found |
|---|---|---|
| Tin | 22.39% | 22.62% |
| Chlorine | 13.38% | 12.51% |

EXAMPLE 6

Preparation of tricyclohexyltin 4-cyanophenate 96.3 grams (0.25 mole) of triclohexyltin hydroxide and 29.78 grams (0.25 mole) of 4-cyanophenol were added to 500 milliliters of benzene in a one liter flask. The procedure of Example 1 was followed to obtain a tricyclohexyltin 4-cyanophenate product exhibiting a weight of 107.3 grams (theoretical 121.6 grams) which was a 88.2% yield. The melting point range was 90°C – 101.0°C.

ANALYSIS

| Percentage | Theory | Found |
|---|---|---|
| Tin | 24.11% | 24.26% |
| Nitrogen | 2.88% | 2.84% |

EXAMPLE 7

Preparation of tricyclohexyltin 4-methylmercaptophenate 96.3 grams (0.25 mole) of tricyclohexyltin hydroxide and 35.05 grams (0.25 mole) of 4-methylmercaptophenol were added to 500 milliliters of benzene in a one liter flask. The procedure of Example 1 was followed to obtain tricyclohexyltin 4-methylmercaptophenate liquid product exhibiting a weight of 120.00 grams (theoretical 126.8 grams) which was a 93.9% yield.

ANALYSIS

| Percentage | Theory | Found |
|---|---|---|
| Tin | 23.4% | 23.63% |
| Sulfur | 6.32% | 6.28% |

EXAMPLE 8

Preparation of tricyclohexyltin-o-phenylphenate 96.3 grams (0.25 mole) of tricyclohexyltin hydroxide and 42.55 grams (0.25 mole) of o-phenylphenol were added to 500 milliliters of benzene. The procedure of Example 1 was followed to obtain a tricyclohexyltin-o-phenylphenate product exhibiting a weight of 130 grams (theoretical 134.3 grams) which was a yield of 96.8% of theoretical. The melting point range was 75.5°C – 77.0°C. The percentage tin was found to be 22.31% (theoretical 22.09%).

The novel compounds of the foregoing examples can be applied to soil or plants, including particularly soil by a variety of means. One of the aspects of this invention is the formulation of compositions such as to permit a uniform predetermined application of the novel compounds to an environment to produce the desired effect. Compositions to be applied to soil or plants include liquid extending agents such as solvent or diluents within which the novel active compounds of this invention are dissolved or suspended; wetting or emulsifying agents which serve in providing uniform dispersions of the solution of the active ingredient in the extending agent and adhesive agent or spreading agent which improves the contact of the novel compounds of this invention with soil and plant surfaces or other surfaces to be protected. Therefore, most compositions for applications usually include an extending agent and a wetting or emulsifying agent.

The novel compounds of this invention need not be dissolved in the extending agent, but may be merely dispersed or suspended in the extending agent as a suspension or emulsion. The novel compounds of this invention may first be dissolved in a suitable organic solvent and the organic solution of the active ingredient then incorporated in water or in an aqueous extending agent in the form of a heterogeneous dispersion. Examples of some suitable organic solvent for use as extending agent includes hexane, benzene, toluene, acetone, cyclohexanone, methyl ethyl ketone, isopropanol, butanediol, methanol, diacetone alcohol, xylene, dioxane, isopropyl ether, ethylene dichloride, tetrachloroethane, hydrogenated naphthalene, solvent naphtha, petroleum fractions, such as kerosene, and the like.

Solid extending agents in the form of particulate solids are very useful in the practice of the present invention. In using this type of extending agent, the active ingredient is either adsorbed or dispersed on or in a finely-divided solid material. Preferably, the solid extending agents are not hygroscopic, but are materials which render the compositions permanently dry and free-flowing. Suitable solid extending agents include the natural clays such as china clays, the bentonites and attapulgites; other minerals such as talc, pyrophyllite, quartz, diatomaceous earth, fuller's earth, chalk, rock phosphate, kaolin, kieselguhr, volcanic ash, salt; chemically modified minerals such as, acid-washed bentonite, precipitated calcium phosphate, calcium carbonate, calcined magnesium, colloidal silica; and other solid materials such as powdered cork, powdered wood, and powdered pecan or walnut shells. These materials are used in finely-divided form, of approximately a size range passing through 20 to 40 mesh or of a finer size. Particulate solid concentrates of compositions are applied to the soil by admixture at the time of application with a particulate solid carrier material.

If desired, the novel compounds of this invention can be applied in a wettable powder using a liquid carrier material. When used by this method, a wetting agent or surface active agent is added to a concentrate composition to render the particulate solid extending agent wettable by water to obtain a stable aqueous dispersion or suspension suitable for use as a spray. Also the extending agent applied as a wettable powder is used in very finely-divided form preferably in a size small as 100 mesh or smaller.

Surface active agents for wetting emulsifying or dispersing serve in providing uniform dispersion of the novel compounds of this invention of liquid and solid types may be either anionic or cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, mineral oils; quaternary salts of high molecular weight acids; rosin soaps, such as salts of abietic acid; sulfuric acid salts of high molecular weight organic compounds; algin soaps; ethylene oxide condensed with fatty acids, alkyl phenols and mercaptans; and other simple and polymeric compositions having both hydrophilic and hydrophobic functions.

Concentrated compositions containing the novel compounds of this invention should have the active novel compounds and the surface active agents present in higher concentrations than the toxicant compositions applied in the field so that upon dilution with a solid or liquid carrier resulting compositions will contain optimum proportions of the active novel compounds and surface active agent. The compositions should be such to obtain uniform distributions and to maintain the active novel compounds to promote rapid assimilation by plants.

The use of a surface active agent may be necessary in formulating liquid concentrate composition to obtain a constant composition of sufficient concentration of the novel compounds of this invention in a liquid extending agent. The liquid extending agent must be selected not only on the basis of the amount of the novel compound of this invention dissolved but also upon the basis of this solution and temperature of the total composition. Thus, in some formulations, a particular combination of solvents gives us sufficiently low solvent temperatures but the amount of the novel compound dissolved or dispersed in the mixture is insufficient and a suitable surface active agent must be selected such that the novel compound can be dispersed in the composition. Preferably a concentrate composition has a solution temperature below 0°C, although compositions having higher solution temperatures can be used.

The concentration of the novel compounds of this invention in a particulate solid or dust concentrate composition may vary over wide ranges depending upon the nature of the solid extending agent. It is to be noted that surface activated agents are not usually required in dust concentrate composition although they can be used if desired. If a dust concentrate composition is to be applied as a wettable powder, however, a surface active agent should be added to the concentrate composition. Ordinarily, the amount of surface activated agent will be in the amount of 0.1–15% by weight of the composition.

The carrier material used for the uniform distribution of the novel compounds of this invention used as pesticides may be either liquid or particulate solid materials. The liquid and solid extending agents used to prepare concentrate compositions may also be used as the carrier. However, the use of the concentrate composition materials carrier may not be economical. Water is the preferred liquid carrier, both for use with the liquid concentrate compositions and wettable powder concentrate. Suitable particulate solid carriers include the particulate extending agents noted above as well as solid fertilizers, such as ammonium nitrate, urea, super phosphate, as well as other materials in which plant organisms may take root and grow such as compost, sand, and humus. Liquid and dust concentrate compositions containing the novel compound of this invention can also contain other addiaments such as fertilizer and pesticides. These addiaments may be used as, or in combination with the carrier materials.

Compositions containing the novel compounds of this invention may be applied to plants in a conventional manner. Thus, dust and liquid compositions may be applied to the foliage of growing plants by use of powered-dusters, broom and hand sprayers, and other spray dusters. Compositions containing the novel compounds of this invention can be applied from airplanes as dust.

EXAMPLE 9

Young bush bean plants the first two leaves of which had developed, were sprayed with aqueous solutions of the compounds of Examples 1 through 8. The solutions contained from 12.5 parts per million to 500 parts per million, by weight, of the compounds of Examples 1 through 8. The plants were then heavily infested with two spotted spider mites. After 7 days, no damage to the plants could be observed.

The effective concentrations of each of the novel compounds of this invention effectively controlled two spotted spider mites as listed in Table I.

TABLE I

Concentration of Aqueous Solutions of the Novel Compounds for Controlling Two Spotted Spider Mites

| Compound of Example No. | Concentration in Parts Per Million to Effectively Control Two Spotted Spider Mites |
|---|---|
| 1 | 12.5 |
| 2 | 25.0 |
| 3 | 25.0 |
| 4 | 50.0 |
| 5 | 12.5 |
| 6 | 25.0 |
| 7 | 25.0 |
| 8 | 12.5 |

In further tests, to determined quantities of water containing daphnia, ram's horn snails, and gold fish were added sufficient quantities of the novel compounds to obtain a concentration of 0.4 to 2 parts per million, by weight, of the novel compounds of Examples 1 through 8. A concentration of 2 parts per million of any of the novel compounds of this invention is sufficient to eradicate daphnia.

In still further tests, emulsion compositions containing 50 parts per million, by weight, of the compounds of Examples 1 through 8, when applied by contact to house flies, American cockroaches, and confused flour beetles, completely eradicated more than 90% of those pests. Thus, coating compositions containing very small quantities of the novel compounds of this invention give a protective coating effective against house flies, American cockroaches, and confused flour beetles.

We claim:
1. A pesticidal composition for controlling mites and insects, the composition consisting essentially of
   1. an inert carrier, and
   2. a miticidally or insecticidally effective amount of a tricyclohexyltin compound of the formula

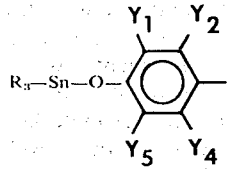

wherein R is cyclohexyl, $Y_{1-5}$ are the same or different and Y is selected from the group consisting of 4-chloro-2-cyclopentyl, phenyl, chloro, cyano, methylmercapto, nitro and hydrogen, such that not more than four Y substituents are hydrogen.

2. A method for controlling mites and insects, said method consisting essentially of contacting said mites and insects with a miticidally and insecticidally effective amount of a tricyclohexyltin compound of the formula

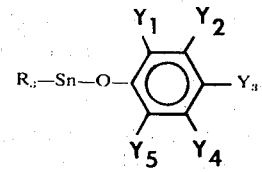

wherein R is cyclohexyl, $Y_{1-5}$ are the same or different and Y is selected from the group consisting of 4-chloro-2-cyclopentyl, phenyl, chloro, cyano, methylmercapto, nitro, and hydrogen, such that not more than four Y substituents are hydrogen.

* * * * *